(12) United States Patent
Messenger et al.

(10) Patent No.: US 12,704,634 B2
(45) Date of Patent: Aug. 11, 2026

(54) SYSTEMS AND METHODS FOR UTILITY POLE LOADING AND/OR CLEARANCE ANALYSES

(71) Applicant: Osmose Utilities Services, Inc., Peachtree City, GA (US)

(72) Inventors: Mark E. Messenger, Peachtree City, GA (US); Randal K. More, Lafayette, NY (US); John Ware, Peachtree City, GA (US)

(73) Assignee: Osmose Utilities Services, Inc., Peachtree City, GA (US)

( * ) Notice: Subject to any disclaimer, the term of this patent is extended or adjusted under 35 U.S.C. 154(b) by 1227 days.

(21) Appl. No.: 17/591,988

(22) Filed: Feb. 3, 2022

(65) Prior Publication Data

US 2023/0243976 A1 Aug. 3, 2023

(51) Int. Cl.

| | |
|---|---|
| ***G01S 17/93*** | (2020.01) |
| ***G01S 7/497*** | (2006.01) |
| ***G01S 17/86*** | (2020.01) |
| ***G01S 17/931*** | (2020.01) |
| ***G06T 7/80*** | (2017.01) |

(52) U.S. Cl.

CPC .......... *G01S 17/931* (2020.01); *G01S 7/4972* (2013.01); *G01S 17/86* (2020.01); *G06T 7/80* (2017.01); *G06T 2207/30252* (2013.01)

(58) Field of Classification Search

None

See application file for complete search history.

(56) References Cited

U.S. PATENT DOCUMENTS

| | | | | |
|---|---|---|---|---|
| 2003/0103651 A1* | 6/2003 | Novak | ................... | G01C 15/00 382/106 |
| 2014/0132723 A1* | 5/2014 | More | ...................... | G01S 7/497 348/46 |
| 2015/0057851 A1* | 2/2015 | Turner | .................... | E01B 35/00 701/19 |

* cited by examiner

*Primary Examiner* — Hovhannes Baghdasaryan

(74) *Attorney, Agent, or Firm* — TROUTMAN PEPPER LOCKE LLP; James E. Schutz; Nicholas H. Doss

(57) ABSTRACT

A system includes a lidar system, a camera system, and a computing device. The computing device can receive lidar data from the lidar system, receive camera data from the camera system, execute object recognition process(es) to identify, from the camera data, a utility pole and components attached to the utility pole and to create corresponding classified camera data. The computing device can align the camera data with the lidar data and can classify the lidar data to create classified lidar data. The computing device can determine characteristics of the components based on the classified camera data and the classified lidar data. Based on the characteristics, the computing system can perform a pole loading analysis, a clearance analysis, and/or a wire sag analysis.

19 Claims, 9 Drawing Sheets

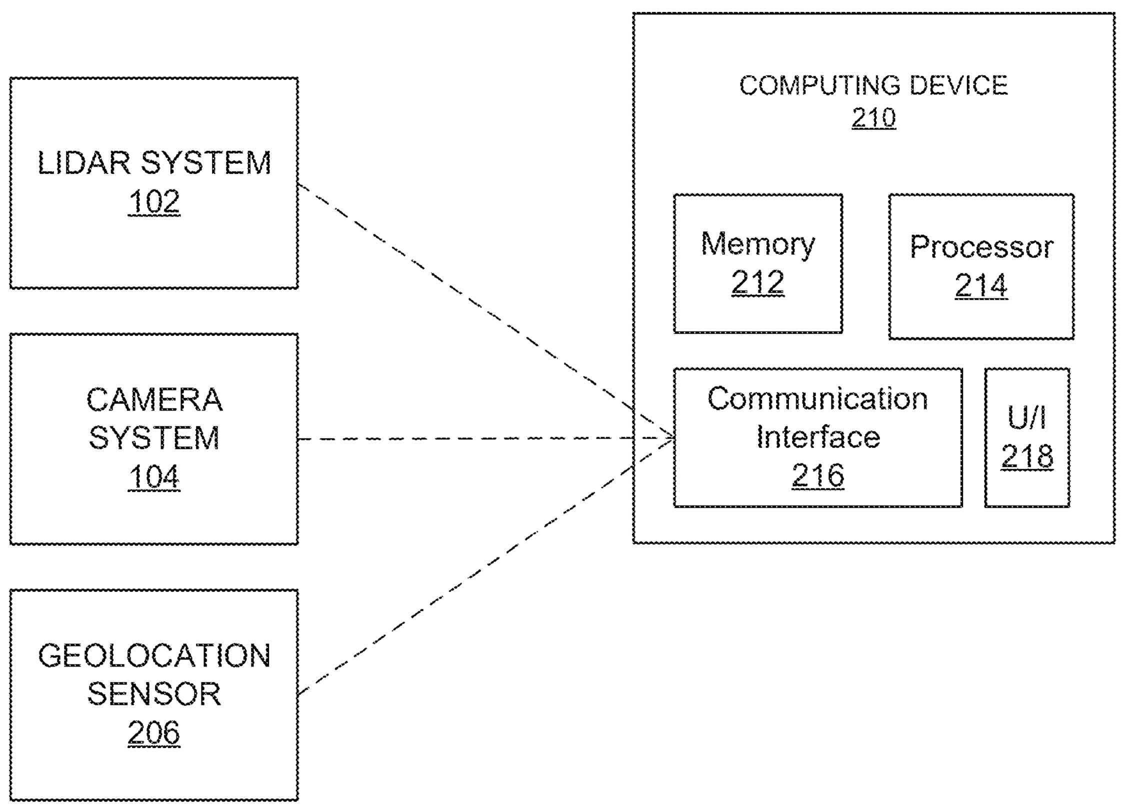
FIG. 2

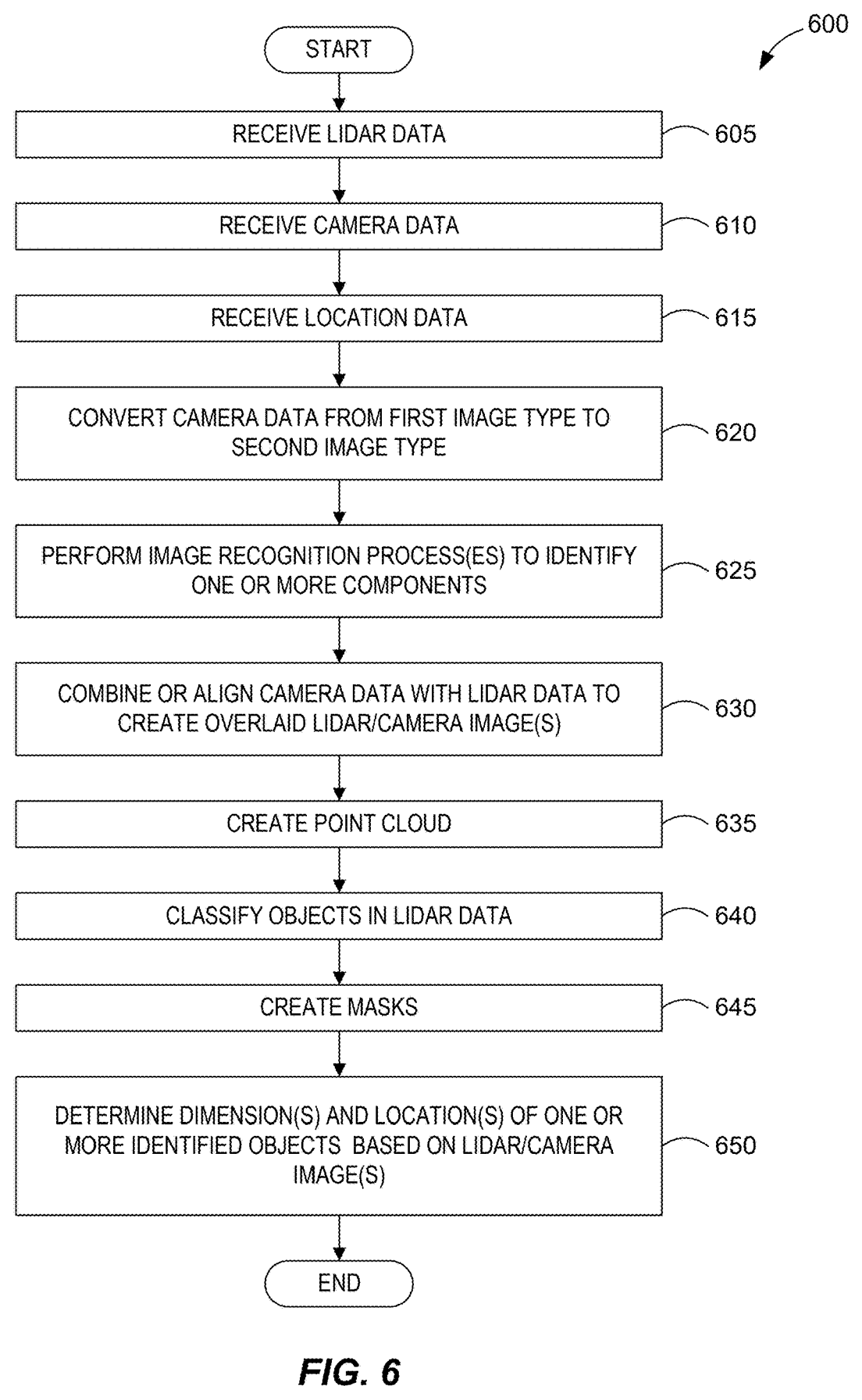

600

START

RECEIVE LIDAR DATA 605

RECEIVE CAMERA DATA 610

RECEIVE LOCATION DATA 615

CONVERT CAMERA DATA FROM FIRST IMAGE TYPE TO SECOND IMAGE TYPE 620

PERFORM IMAGE RECOGNITION PROCESS(ES) TO IDENTIFY ONE OR MORE COMPONENTS 625

COMBINE OR ALIGN CAMERA DATA WITH LIDAR DATA TO CREATE OVERLAID LIDAR/CAMERA IMAGE(S) 630

CREATE POINT CLOUD 635

CLASSIFY OBJECTS IN LIDAR DATA 640

CREATE MASKS 645

DETERMINE DIMENSION(S) AND LOCATION(S) OF ONE OR MORE IDENTIFIED OBJECTS BASED ON LIDAR/CAMERA IMAGE(S) 650

END

*FIG. 6*

SYSTEMS AND METHODS FOR UTILITY POLE LOADING AND/OR CLEARANCE ANALYSES

BACKGROUND

Utility lines, such as those carrying electrical power, cable television signals, or telephone signals, have traditionally been supported above ground using poles, which are typically wooden (although such poles or similar structures may be made at least in part using other materials, such as one or more metals). These poles must be capable of withstanding the columnar load applied by the weight of the objects supported thereon (e.g., various cables, wires, devices, and/or components), as well as various transverse or horizontal loads, such as those imposed by transverse winds or unbalanced wire tensions, as non-limiting examples.

Governing bodies can also impose basic safety requirements for the loading of utility poles, such as the National Electrical Safety Code (NESC) published by the Institute of Electrical and Electronics Engineers, Inc. (IEEE). To ensure a given pole complies with such standards and/or to prevent structural failure of the pole, it can be helpful to perform a pole loading analysis. Moreover, a pole loading analysis can be helpful to determine whether a given pole has the loading capacity and/or physical attachment space available for an additional device to be installed on the pole.

Typically, utility poles, and wooden poles in particular, are classified into pole classes according to their size and strength. These pole classes help to quickly inform an approximate loading capacity for a given pole. However, to determine if the loading capacity for a given pole is exceeded (or to determine if additional loading capacity is available), technicians are typically required to physically travel to a pole's location and visually inspect the pole to identify the number and type of objects (e.g., cables, wires, devices, and/or components) installed on the pole. This physical inventorying process must be repeated for each pole, and the load for each pole is then calculated.

This pole loading analysis process, however, can be extraordinarily cumbersome and impracticable difficult due to, as non-limiting examples, the sheer number of poles and the difficulty in physically accessing certain poles, which can be located at the far reaches of a utility network, such as isolated regions that are not readily accessible by road. Also, this process can be time-consuming and expensive due to, for example, the large number of man hours required to inventory poles for a given utility network. Further, because existing processes are reliant on human observation and data logging by a large number of technicians, it is possible that certain data can be inaccurate or inconsistently obtained and/or logged.

In addition to pole loading analyses, technicians are often required to conduct a clearance analysis for a given pole, determining whether sufficient space exists on a pole or along existing spans for a new piece of equipment to be installed on the pole. These measurements are difficult to accurately obtain and can, in some circumstances, be simply estimated by a technician. This can lead to inaccurate estimates, which can cause waste or inefficiencies in time, money, and/or effort.

For example, a technician may estimate that sufficient space exists on a pole for a new device to be installed, but once the installation has been attempted, it may become apparent that there is insufficient space available for the new device. Thus, the technician will have wasted time and effort attempting to install a device at a location that cannot accommodate the device, and/or the utility service provider may have invested in infrastructure corresponding to the new device, which now carries increased costs due to, for example, having to relocate various existing devices on the pole and/or install an additional pole to accommodate the new device.

As another example, a technician may estimate that insufficient space exists on a pole or along existing spans for a new device, and the utility service provider may determine to forego installing a new device on the pole. However, the clearance estimate may have been inaccurate, resulting in the utility service provider incurring a missed opportunity to provide an additional service on the existing pole.

Accordingly, there is a need for improved systems and methods that increase the accuracy, consistency, speed, efficiency, and/or cost-effectiveness by which a pole loading analysis and/or a clearance analysis can be performed for a utility pole or any number of utility poles (e.g., a network of utility poles).

SUMMARY

These and other problems are addressed by certain aspects and attributes of the disclosed technology. For example, the disclosed technology relates to combining camera data with lidar data to create an overlaid lidar/camera image and determining characteristics of components installed on a utility pole based on the overlaid lidar/camera image. Based on these characteristics, a pole loading analysis, a clearance analysis, and/or a wire sag analysis can be performed.

The disclosed technology includes a system comprising a lidar system configured to obtain lidar data, a camera system configured to obtain camera data, and a computing device configured to receive lidar data from the lidar system and receive camera data from the camera system. The computing device can be configured to execute one or more object recognition processes with the camera data to identify recognized objects from the camera data and create classified camera data corresponding to the recognized objects. The recognized objects can include a utility pole and one or more components attached to the utility pole. The computing device can be configured to align the camera data with the lidar data. The computing device can be configured to classify the lidar data to create classified lidar data, and classifying the lidar data can include identifying a portion of the lidar data that corresponds to the recognized objects from the camera data. The computing device can be configured to determine a component load for each of the one or more components and can determine a total load for the utility pole. The total load can include the component load for each of the one or more components.

The computing device can be configured to determine that the total load for the utility pole exceeds a load rating for the utility pole and output a notification for a remote computing device. The notification can identify the utility pole and can indicate that the total load for the utility pole exceeds the load rating for the utility pole. The notification can include instructions for structurally reinforcing the utility pole, thereby increasing the load rating for the utility pole. The notification can include instructions for removing at least one of the one or more components from the utility pole. The notification can include instructions for installing a new utility pole and installing the at least one of the one or more components on the new utility pole.

The computing device can be configured to determine one or more dimensions of at least one of the one or more components based at least in part on the overlaid lidar/camera image.

The computing device can be configured to determine, based at least in part on the classified camera data and the classified lidar data, a pole location for each of the one or more components. Each pole location can include a location along a length of the utility pole. Each pole location can include a location along a circumference of the utility pole.

The disclosed technology includes a system comprising a lidar system configured to obtain lidar data, a camera system configured to obtain camera data, and a computing device configured to receive lidar data from the lidar system and receive camera data from the camera system. The computing device can be configured to execute one or more object recognition processes with the camera data to identify recognized objects from the camera data and create classified camera data corresponding to the recognized objects. The recognized objects can include a utility pole and one or more components attached to the utility pole. The computing device can be configured to align the camera data with the lidar data. The computing device can be configured to classify the lidar data to create classified lidar data, and classifying the lidar data can include identifying a portion of the lidar data that corresponds to the recognized objects from the camera data. The computing device can be configured to determine, based at least in part on the classified camera data and the classified lidar data, a pole location for each of the one or more components. Each pole location can include a location along a length of the utility pole. The computing device can be configured to receive a request for a new component to be installed on the utility pole, and the computing device can be configured to determine, based at least in part on a size of the new component and the pole location for each of the one or more components, whether sufficient space is available on the utility pole for installation of the new component.

The computing device can be configured to determine, based on a component type of the new component, a required pole location for the new component. Determining whether sufficient space is available on the utility pole for installation of the new component can be based at least in part on the required pole location for the new component.

The computing device can be configured to identify an installation location for the new component in response to determining that sufficient space is available. The installation location can be a location on the utility pole. The computing device can be configured to output a notification for a remote computing device, and the notification can include instructions for installing the new component on the utility pole at the installation location.

The computing device can be configured to, in response to determining that sufficient space is not available, determine whether any of the one or more components attached to the utility pole can be rearranged to create sufficient space for the new component.

The computing device can be configured to, in response to determining that the one or more components attached to the utility pole can be rearranged to create sufficient space for the new component, output a notification for a remote computing device, and the notification can include instructions for rearranging at least one of the one or more components and installing the new component on the utility pole.

The computing device can be configured to, in response to determining that the one or more components attached to the utility pole cannot be rearranged to create sufficient space for the new component, output a notification for a remote computing device, and the notification can indicate that sufficient space for the new component is not available.

The disclosed technology includes a system comprising a lidar system configured to obtain lidar data, a camera system configured to obtain camera data, and a computing device configured to receive lidar data from the lidar system and receive camera data from the camera system. The computing device can be configured to execute one or more object recognition processes with the camera data to identify recognized objects from the camera data and create classified camera data corresponding to the recognized objects. The recognized objects can include a utility pole and one or more components attached to the utility pole. The computing device can be configured to align the camera data with the lidar data. The computing device can be configured to classify the lidar data to create classified lidar data, and classifying the lidar data can include identifying a portion of the lidar data that corresponds to the recognized objects from the camera data. The computing device can be configured to determine, based at least in part on the classified camera data and the classified lidar data, a current sag of the wire.

The computing device can be configured to determine current environmental conditions at a location of the wire and calculate an estimated maximum sag based at least in part on the current sag, the current environmental conditions, and different environmental conditions.

The computing device can be configured to calculate an estimated minimum wire height based at least in part on the estimated maximum sag. The computing device can be configured to determine, based at least in part on the estimated minimum wire height, that the wire should be moved to a new attachment point on the utility pole that has a greater height than a current attachment point of the wire. The computing device can be configured to output a notification for a remote computing device, and the notification can include instructions for moving the wire from the current attachment point to the new attachment point.

Determining that the wire should be moved to the new attachment point on the utility pole can include determining, based at least in part on the classified camera data and the classified lidar data, a height of an object near the wire and determining that a difference between the estimated minimum wire height and the height of the object is less than a predetermined threshold.

Other examples, embodiments, features, and aspects of the disclosed technology are described in detail herein and are considered a part of the claimed disclosed technology. Other embodiments, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIG. 2 illustrates a component diagram of an example lidar/camera system, in accordance with the disclosed technology;

FIG. 6 illustrates a flowchart of an example method for classifying lidar data and/or identifying one or more objects represented by lidar data, in accordance with the disclosed technology;

DETAILED DESCRIPTION

Figure 1A:
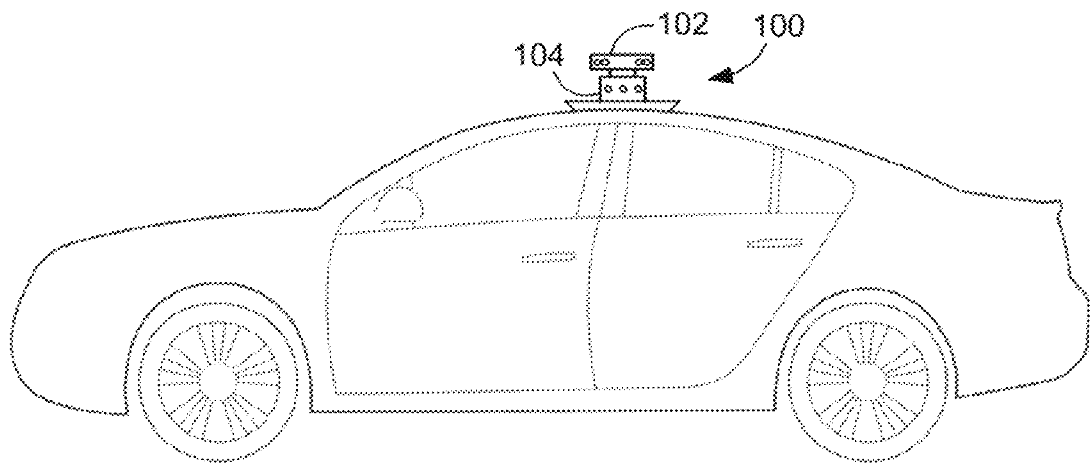
FIGS. 1A and 1B illustrate an example lidar/camera system installed on example vehicles, in accordance with the disclosed technology.

The disclosed technology includes systems and methods for performing a utility pole loading analysis and/or a clearance analysis for a utility pole. For example, the disclosed technology can include capturing lidar (also known as LIDAR, LiDAR, and LADAR) data (e.g., via a lidar system) and image data (e.g., via a camera system), identifying one or more objects (e.g., via one or more image recognition processes) from the image data, mapping the lidar data to corresponding image data, and determining one or more measurements based at least in part on the lidar data for at least one of the identified objects. The disclosed technology can include determining a load associated with the identified object(s) and/or can include determining a location on the pole at which one or more identified objects is located.

As will be appreciated, the disclosed technology is not limited to systems and methods for performing a pole loading analysis. Indeed, the disclosed technology can be useful in any application or scenario in which lidar data is mapped to image data and the lidar data is classified based on objects or aspects identified from the mapped image data. That is to say, the disclosed technology included systems and methods configured to classify and identify objects represented by lidar data.

Aspects of the disclosed technology will be described more fully hereinafter with reference to the accompanying drawings. This disclosed technology can, however, be embodied in many different forms and should not be construed as limited to the examples set forth therein.

In the following description, numerous specific details are set forth. However, it is to be understood that various examples of the disclosed technology can be practiced without these specific details. In other instances, well-known methods, structures, and techniques have not been shown in detail in order to not obscure an understanding of this description. References to "one embodiment," "an embodiment," "example embodiment," "some embodiments," "certain embodiments," "various embodiments," "one example," "an example," "some examples," "certain examples," "various examples," etc., indicate that the example(s) of the disclosed technology so described can include a particular feature, structure, or characteristic, but not every implementation of the disclosed technology necessarily includes the particular feature, structure, or characteristic.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

As used herein, the term "pole" includes various forms and definitions of elongated support members (e.g., posts, pilings), whether or not constructed of wood.

Unless otherwise specified, any range of values provided herein is inclusive of its endpoints. For example, the phrases "between 4 and 6" and "from 4 to 6" both indicate a range of values that includes 4, 6, and all values therebetween.

As discussed, performing a pole loading analysis typically requires inventorying utility poles and the components installed thereon, and the inventorying aspect can be an arduous, difficult, time-consuming, and/or expensive task, which can be all the more difficult if poles that are located in remote regions must be inventoried. To improve this process, the disclosed technology contemplates the use of a lidar system to capture lidar data associated with one or more utility poles (e.g., a utility pole network).

Lidar is a technique that is increasingly used in a variety of applications, such as mapping, surveying, and navigation in autonomous vehicles. The method generally includes targeting an object with a pulsed laser and measuring the time for the reflected light to return to a receiver. The return times for the laser pulses are associated with the corresponding locations targeted by the laser pulses, and by aggregating this data across an area, a topographical representation of the surfaces located with the area can be created.

Existing lidar methods can provide information that is generally sufficient to perform measurements of objects from a remote location. Thus, in some applications, such as autonomous vehicle applications, lidar has been used to determine whether an object is present (e.g., whether an object is in front of the autonomous vehicle). However, it has proven difficult for lidar systems to identify or classify objects. That is, lidar systems can generally detect the presence of an object, but existing lidar systems have been unable to determine what type of object has been detected.

The disclosed technology addresses this issue with systems and methods relating to identifying and/or classifying objects indicated by lidar data. As discussed more fully herein, the disclosed technology can be useful in several scenarios and applications. However, for the sake of brevity, the disclosed technology is primarily discussed as being used for inventorying utility pole(s), inventorying the components installed on one or more utility poles, and/or mapping the location(s) of one or more components on a given utility pole.

Figure 1B:
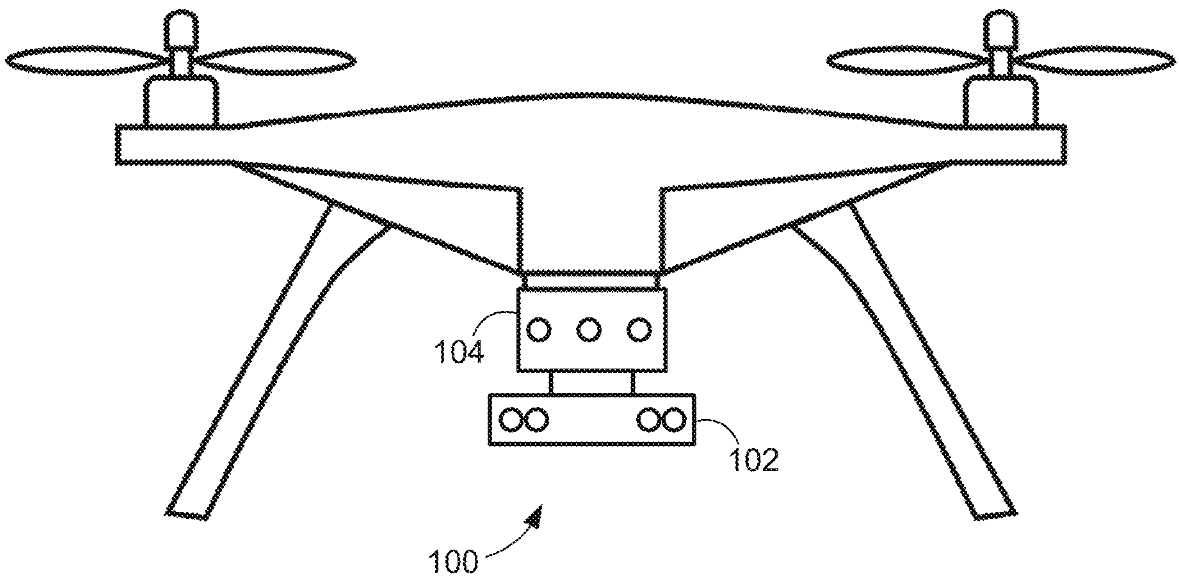
Figure 3:
FIG. 3 illustrates an example equirectangular camera image taken by a camera system of an example lidar/camera system, in accordance with the disclosed technology.

The methods and processes described herein can be performed, in whole or in part, by a lidar/camera system 100 including a lidar system 102 and a camera system 104. As shown in FIGS. 1A and 1B, the system 100 can be attached to a vehicle, such as an automobile or an aircraft (e.g., a drone). The system 100 can alternatively include or be attached to a be a user-carriable system, such as a backpack. The camera system 104 can include one or more lenses or other optical sensors (each referred to herein as a "camera" for simplicity). For example, the camera system 104 can include multiple cameras, and each camera can be oriented in a different radially outward direction. For example, the cameras can be positioned and oriented such that the camera system 104 can simultaneously capture camera data in multiple directions surrounding the camera system 104 (e.g., 360-degree images). An example multi-directional image is illustrated in FIG. 3. It should be noted that, the camera data discussed herein generally relates to data representing images captured in the visible light spectrum, the disclosed technology is not so limited. For example, the disclosed technology can, alternatively or in addition, include camera data representative of images captured in other light spectrums, such as the infrared light spectrum and/or ultraviolet light spectrum).

The lidar system 102 can include a laser and a receiver configured to detect reflections of the beam provided by the laser (referred to herein as a "lidar scanner" for simplicity). The lidar system 102 can include multiple lidar scanners. Each lidar scanner can be oriented in a different radially outward direction. For example, the lidar scanners can be positioned and oriented such that the lidar system 102 can simultaneously capture lidar data in multiple directions surrounding the lidar system 102 (e.g., 360-degree lidar images). Optionally, the system 100 can include a stabilizing system, device, or mechanism, such as a gimbal, which can help decrease any blurred imaging or otherwise corrupted data captured by the lidar system 102 and/or camera system 104.

Referring to FIG. 2, the system 100 can include a computing device 210. As described more fully herein, the computing device 210 can receive data, such as from the lidar system 102, the camera system 104, and/or a geolocation sensor 206 of the system 100, and/or the computing device can output instructions to one or more components (e.g., the lidar system 102, the camera system 104, and/or a geolocation sensor 206). For example, the computing device 210 can perform one or more of the methods described herein or any part thereof. The computing device 210 can be or include any control or computing system, such as a dedicated controller for the system 100, a locally located computing device, a remotely located computing device (e.g., backend server), and/or any combination thereof. This disclosure references a single computing device 210 for simplicity of discussion, but the disclosed technology is not so limited. For example, multiple computing devices (e.g., a network of computing devices) can be used to perform one, some, or all of the actions and/or functionalities described herein. Moreover, a first computing device can perform one or more actions and/or functionalities, and a second computing device can perform one or more other actions and/or functionalities. As a specific example, it is contemplated that a local controller is configured to receive data from the lidar system 102, camera system 104, and/or geolocation sensor 206, and the controller can transmit some or all of that data to a computing device that is configured to perform some or all of the analyses described herein. The computing device can be in direct wired or wireless communication with the controller, in indirect wired or wireless communication with the controller (e.g., via a network), locally located (i.e., with respect to the controller), and/or remotely located. As will be appreciated, any combination of steps described herein can be performed by a first computing device, and any combination of other steps described herein can be performed by a second computing device. That is to say, the disclosed technology contemplates transmission and receipt of data between different computing devices, although such steps may not be expressly discussed herein.

The computing device 210 can include memory 212, a processor 214, a communication interface 216, and/or a user interface 218. The computing device 210 can communicate with one or more sensors and/or devices, via the communication interface 216, as a non-limiting example. For example, the computing device 210 can receive data from the lidar system 102, the camera system 104, and/or a geolocation sensor 206. The computing device 210 can output instructions to one, some, or all of these or other components (e.g., instructions to engage or disengage).

The computing device 210 can associate current lidar data (e.g., received from the lidar system 102) and/or current camera data (e.g., received from the camera system 104) with current location data (e.g., received from the geolocation sensor 206). Accordingly, the computing device 210 can associate each image with the location at which the image was captured. This can be helpful in identifying the location and/or identity of a utility pole captured in the lidar and/or camera data.

As will be described more fully herein, the lidar system 104 can capture lidar data and transmit the lidar data to the computing device 210. The lidar data can comprise and/or be indicative of a point cloud. Alternatively, the computing device 210 can create a point cloud based on the lidar data. As will be appreciated, a point cloud can be a data set representing points in space. Each point can have a set of coordinates (e.g., Cartesian coordinates). Thus, the points can, for example, represent a three-dimensional shape or object. As discussed elsewhere herein, this data can be useful for determining whether an object is present in a space, but existing lidar systems have been generally unable to identify the object with any useful specificity.

To address this issue, the system can use camera data to better identify objects. The camera system 102 can capture one or more images and can transmit the corresponding camera data, which is representative of the image(s), to the computing device 210. The camera data can be representative of any type of image; as non-limiting examples, the camera data can be representative of 360-degree images, 180-degree images, fisheye images, equirectangular images, wide angle images, and/or normal/perspective images. The computing device 210 can optionally convert the camera data to a different image type. For example, the computing device 210 can convert camera data indicating fisheye images to "normal" images that reproduce a field of view that appears natural to a human observer (e.g., perspective images).

The computing device 210 can perform one or more image recognition processes. For example, the computing device 210 can execute one or more object recognition algorithms and/or perform one or more image processing methods, such as Scale-Invariant Feature Transform (SIFT), Speeded Up Robust Features (SURF), Principal Component Analysis (PCA), Linear Discriminant Analysis (LDA), Region Based Convolutional Neural Networks (R-CNN), Fast R-CNN, Faster R-CNN, Mask R-CNN, Histogram of Oriented Gradients (HOG), Region-Based Fully Convolutional Network (R-FCN), simultaneous location and mapping (SLAM), Single Shot Detector (SSD), Spatial Pyramid Pooling (SPP-net), or You Only Look Once (YOLO), as non-limiting examples.

In the case of a utility pole, the computing device 210 can identify and/or recognize several different components, sub-components, and the like. For example, the computing device can identify, recognize, and/or locate utility poles, crossarms, transformers, insulators, lightning arrestors, various electrical wires (e.g., primary wires, neutral wires, secondary wires, and/or ground wires), cutouts, various communication wires (e.g., telephone wires, internet wires, and/or cable wires), guy wires, lamps, and the like. Optionally, the computing device 210 can identify and/or recognize different models or types of the components, sub-components, and the like. Based on the identified model of a given component or sub-component, the computing device 210 can estimate an age of the component or sub-component. The computing device 210 can log or create an inventory of the devices, components, and/or sub-components installed on the pole.

The computing device 210 can be configured to identify various components, sub-components, and the like in one or more given images using bounding boxes, semantic segmentation, and/or instance segmentation. The computing device 210 can be configured to apply such process(es) to traditional perspective images and/or 360-degree images, as non-limiting examples.

The computing device 210 can identify and/or recognize objects that are not attached to the utility pole. For example, the computing device 210 can identify and/or recognize objects that may interfere with the pole or components attached thereto (e.g., wires), such as vegetation (e.g., trees), buildings, road signs, and other structures.

The computing device 210 can identify and/or recognize objects connecting adjacent poles, such as wires. The computing device 210 can create a line corridor that includes the wires extending between neighboring poles. The line corridor can include a plurality of poles that are each connected via the wires or other components. The line corridor can help identify interactions or potentials interactions between the utility pole components and other objects, such as vegetation (e.g., trees), buildings, road signs, and other structures.

Figure 4:
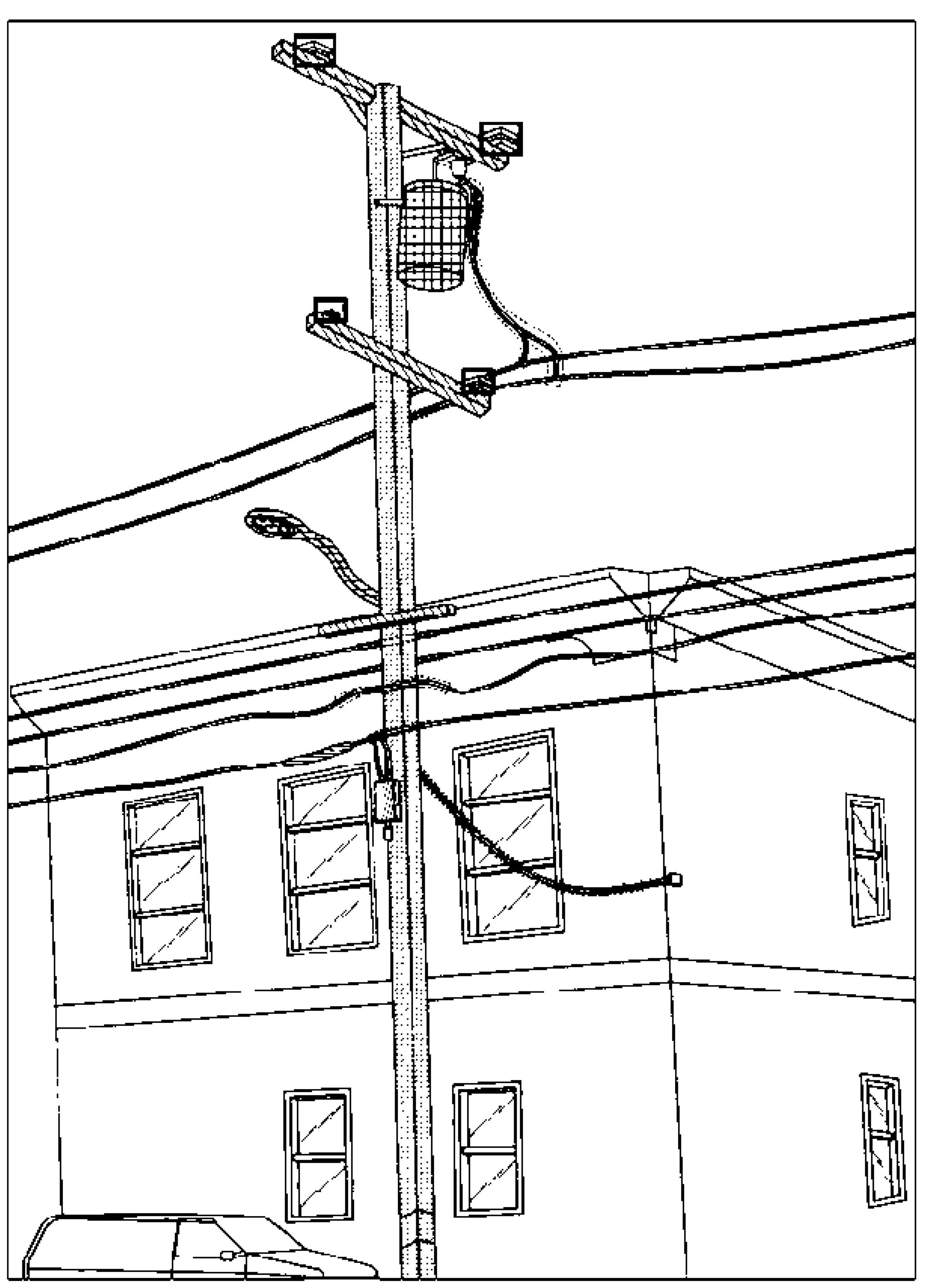
FIG. 4 illustrates an example masked camera image taken by a camera system of an example lidar/camera system truss attached to a pole, in accordance with the disclosed technology.

The computing device 210 can output instructions for displaying (e.g., on a display device) one or more images based on the camera data. Optionally, the computing device 210 can create masks or other image segmentation elements over recognized or identified objects. For example, the computing device 210 can color code objects based on their object type. That is, a first type of device can be a first color, a second type of device can be a second color, and so on. Other types of masks are contemplated. For example, FIG. 4 illustrates various devices and/or components and distinguishes these devices and/or components using different forms of shading and/or hashing. Regardless, the computing device 210 can output instructions for displaying the one or more images along with one or more masks. As will be appreciated, this can help a user to quickly and easily recognize different objects in an image.

Figure 5A:
FIG. 5A illustrates an example camera image.
Figure 5B:
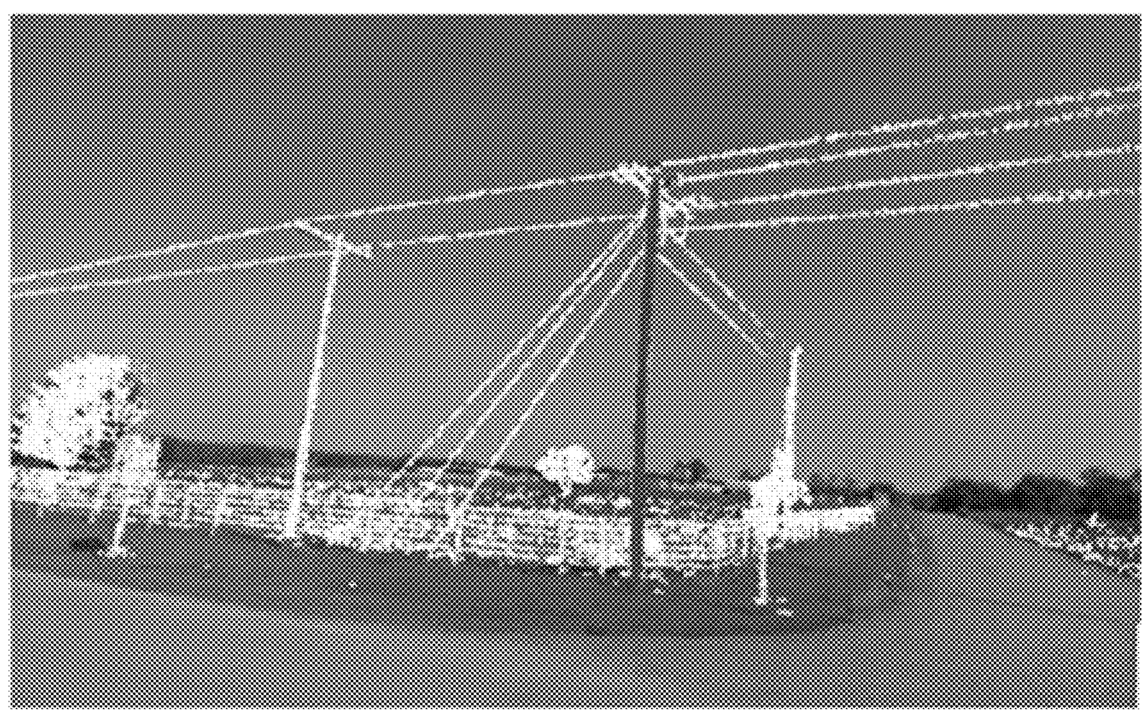
FIG. 5B illustrates the camera image of FIG. 5A combined with a point cloud of lidar data, in accordance with the disclosed technology.

The computing device 210 can combine or align the camera data (e.g., one or more images from the camera data) with the lidar data. For example, the computing device 210 can map the lidar points directly to corresponding pixels in the one or more images from the camera data. The computing device 210 can create a point cloud based on the lidar data and/or the camera data. For example, the computing device 210 can trim or discard all lidar points beyond a particular distance from the edge of a recognized or identified object (e.g., from the camera data), such that the resulting lidar data forms the point cloud. As a more specific example, the computing device can combine or align images, such as the image depicted in FIG. 5A, with the lidar data and trim the lidar data that does not correspond to recognized or identified objects, which can result in a combined lidar/camera image, such as the combined lidar/camera image depicted in FIG. 5B. The computing device 210 can classify lidar data by mapping the image recognition results from camera data to the lidar data or by any other method as described herein.

The computing device 210 can associate or map the lidar points to the corresponding pixels of the camera data before identifying objects and/or before creating the masks or other image segmentation elements over identified objects. However, this order or operations may result in unnecessary computations. That is, by first identifying objects and/or creating the masks or other image segmentation elements, lidar data that does not correspond to identified objects can be ignored or discarded at the pixel association step, which can help reduce the amount of computing required, thereby saving time and energy. For example, the computing device 210 can associate or map to the camera data only the lidar data corresponding to the line corridor. Thus, the data size can be reduced, which can help enable the system 100 to more efficiently and/or effectively utilize the data of interest.

Based at least in part on the lidar data, the camera data, and/or the location data, the computing device 210 can create a map indicating the locations of one or more poles (e.g., a line corridor). Thus, service providers can be informed as to where the poles are located relative to customers or potential customers, which can be useful, for example, when a service provider is determining how best to develop an infrastructure for a new service. As an example, the map of pole locations can be helpful for an internet service provider in determining how best to build a broadband network to provide broadband internet to rural areas. Because the internet service provider is unlikely to know where utility poles are located, this information can be helpful for the internet service provider to determine whether it is feasible to provide internet service to its customers or potential customers via the utility poles.

Based on the lidar data and the camera data, the computing device 210 can determine the size (e.g., dimensions) of one, some, or all of the identified components. Alternatively or in addition, the computing device 210 can determine or calculate the location of one, some, or all of the identified components. For example, for a given device installed on the pole, the computing device 210 can determine the height of a lowermost portion of the device and the height of the uppermost portion of the device. By determining the location of each component on the pole, the computing device 210 can determine whether and to what extent space is available on the pole for additional devices or components. The computing device 210 can create a map or layout for a given pole, and the map can indicate the type, size, and location of each device, component, sub-component, or the like that is installed on the pole. Further, the computing device 210 can create a map or layout for a plurality of poles in a line or network. Thus, the computing device 210 can identify whether space is available for a new line, additional devices, or the like. Alternatively or in addition, the computing device 210 can determine whether existing devices or components must be moved to accommodate installation of a new line, additional devices, or the like. The computing device 210 can automatically output a notification to a technician device (e.g., a mobile computing device) or another device (e.g., a device for a utility pole service provider or a utility service provider) including instructions for to move one or more existing devices or components to accommodate installation of a new line, device, or the like (commonly referred to as "make ready engineering" or "MRE"). The instructions can inform the technician to move one or more existing devices or components from their respective current locations to respective new locations, thereby making room for the new line, device, or the like.

The computing device 210 can determine other aspects and attributes related to the utility pole(s). For example, the computing device 210 can determine a diameter and a height of the utility pole. Based on the location of the pole (e.g., based on the location data received from the geolocation sensor 206), the computing device 210 can cross-reference these attributes with a pole database; accordingly, the computing device 210 can confirm or update the pole class stored in the database for the particular pole.

The computing device 210 can automatically perform a pole loading analysis based on the pole class and/or the identified components. The computing device 210 can automatically determine whether the results of the pole loading analysis comply with governing standards and regulations (e.g., based on the location data). If the pole loading analysis indicates that the current pole loading exceeds governing standards and regulations, the computing device 210 can output a notification to a device (e.g., a device for a technician, a utility pole service provider, and/or a utility service provider) indicating that the pole is experiencing excessive pole loading. The notification can instruct the technician to remove one or more devices (e.g., one or more specific devices based on their weight, for example) from the pole and/or install a new pole to accommodate one or more devices currently installed on the pole.

Based on the lidar data and the camera data, the computing device 210 can measure various aspects of the wires or other components extending between adjacent poles. For example, the computing device 210 can measure the span lengths between adjacent poles and/or the wire angles (e.g., the angle at which a wire leaves one pole toward another object, such as another pole). As will be appreciated, this would greatly increase the ease and accuracy of field measurements for span lengths and/or wire angles, which are traditionally measured by a technician using a laser, wheel, and protractor.

The computing device 210 can model the sag of wires according to various environmental conditions, such as ambient temperature and/or humidity. Thus, the computing device 210 can determine whether the sag of the wires differs under environmental conditions different from the environmental conditions in which the wires were initially installed. The computing device 210 can compare the modeled sag to the height and location of nearby objects, governing standards and regulations, and the like. Based on this comparison, the computing device 210 can determine whether and/or to what extent a corresponding insulator or other attachment point for the wires should be moved (e.g., to accommodate different lags of sag caused by changes in environmental conditions). Alternatively or in addition, the computing device can determine whether a new pole should be installed between the instant pole and the currently adjacent pole to prevent excessive sag in the wires. The computing device 210 can output a notification to a device (e.g., a device for a technician, a utility pole service provider, and/or a utility service provider) that includes instructions for moving one or more devices or other components and/or to install a new pole, to thereby reduce sag and/or prevent excessive sag of the wires.

The user interface 218 of the computing device 210 (or a user interface of a different device, such as a technician device) can enable the technician or another user to interact with the overlaid and/or combined lidar and camera data. Thus, the technician or user can manually request the type of devices installed on a given pole (or multiple poles), specific measurements of one or more devices on a given pole (or multiple poles), the locations of the device(s), and other information. The user or technician can manipulate the combined lidar/camera data, such as moving a given device or component to a new location on the pole. In such a manner, the user or technician can alter or override proposed location changes for existing devices or components and/or a proposed pole addition that were automatically generated by the computing device 210. Upon receive of the instructions from the technician or user, the computing device 210 can output instructions to the technician device or another device (e.g., a device for a utility pole service provider or a utility service provider) for moving or removing one or more devices or other components on the pole and/or to install a new pole.

As discussed herein, the disclosed technology includes systems and methods for classifying lidar data and/or identifying one or more objects represented by lidar data, performing a utility pole loading analysis, and performing a clearance analysis for a utility pole. The features and other aspects and principles of the disclosed technology may be implemented in various environments. Such environments and related applications may be specifically constructed for performing the various processes and operations of the disclosed technology or they may include a general-purpose computer or computing platform selectively activated or reconfigured by program code to provide the necessary functionality. Further, the processes disclosed herein may be implemented by a suitable combination of hardware, software, and/or firmware. For example, the disclosed technology may implement general purpose machines configured to execute software programs that perform processes consistent with the disclosed technology. Alternatively, the disclosed technology may implement a specialized apparatus or system configured to execute software programs that perform processes consistent with the disclosed technology. Furthermore, although some disclosed technology may be implemented by general purpose machines as computer processing instructions, all or a portion of the functionality of the disclosed technology may be implemented instead in dedicated electronics hardware.

The disclosed technology also relates to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed technology may execute high level and/or low-level software instructions, such as machine code (e.g., such as that produced by a compiler) and/or high-level code that can be executed by a processor using an interpreter.

FIG. 6 shows a flowchart of a method 600 for classifying lidar data and/or identifying one or more objects represented by lidar data. The method 600 can be performed in whole or in part by the computing device 210, a controller, or any other computing device. Moreover, the method 600 can be performed in conjunction with some or all of any other method described herein (e.g., method 700, method 800, method 900).

The method 600 includes receiving 605 lidar data (e.g., from lidar system 102) and receiving 610 camera data (e.g., from camera system 104). Optionally, the method 600 can include receiving 615 location data (e.g., from geolocation sensor 206). The location data can correspond to the lidar data and/or the camera data.

Optionally, the method 600 can include converting 620 the camera data from a first image type to a second image type. This can help make the camera data more similar to the lidar data. For example, the camera data can be converted such that the camera data and the lidar data represent the same or similar view or perspective of the imaged environment. The received camera data can be representative of any type of image; as non-limiting examples, the camera data can be representative of 360-degree images, 180-degree images, fisheye images, equirectangular images, spherical images, panoramic images, stereo spherical equirectangular images, stereoscopic images, stereo spherical images, cube maps, wide angle images, and/or normal/perspective images. Thus, the method 600 can include converting the image type of the received camera data (e.g., fisheye images) to a target image type (e.g., perspective images and/or "normal" images that reproduce a field of view that appears natural to a human observer). As additional examples, the method 600 can include converting received two-dimensional images to three-dimensional images, or the method 600 can include converting received three-dimensional images to two-dimensional images, as required by, or preferred for, a given process.

The method 600 can include performing 625 one or more image and/or object recognition processes to identify one or more devices and/or components represented by the camera data, whether it be received camera data or converted camera data. As discussed herein, the disclosed technology contemplates any useful image and/or object recognition process, such as such as Scale-Invariant Feature Transform (SIFT), Speeded Up Robust Features (SURF), Principal Component Analysis (PCA), Linear Discriminant Analysis (LDA), Region Based Convolutional Neural Networks (R-CNN), Fast R-CNN, Faster R-CNN, Mask R-CNN, Histogram of Oriented Gradients (HOG), Region-Based Fully Convolutional Network (R-FCN), Single Shot Detector (SSD), Spatial Pyramid Pooling (SPP-net), or You Only Look Once (YOLO), as non-limiting examples.

While the method 600 is described and illustrated as first converting 620 the camera data from the first image type to the second image type and subsequently performing 625 the one or more image and/or object recognition processes, the disclosed technology is not so limited. Indeed, the method 600 can alternatively include first performing 625 the one or more image and/or object recognition processes and subsequently converting 620 the camera data from the first image type to the second image type. As will be appreciated by one having skill in the art, the particular steps that are useful or required can depend on the image type being used. For example, analyses performed on camera data of a traditional perspective format can be achieved by performing 625 the one or more image and/or object recognition processes without needing to convert 620 the camera data from the first image type to the second image type. Alternatively, to perform analyses on camera data of a 360-degree format, it can be useful to both convert 620 the camera data (e.g., to a two-dimensional format) and perform 625 the one or more image and/or object recognition processes.

Regardless, the output of the image and/or object recognition process(es) can include the pixel coordinates for one or more (e.g., one, some, or all) objects recognized within the camera data (whether it be received camera data or converted camera data). For example, the pixel coordinates for a given object can include pixel coordinates for each corner of a corresponding bounding box, pixel coordinates for each pixel within a corresponding semantic segmentation, and/or the pixel coordinates for each pixel within a corresponding instance segmentation.

The results for each individual object can be grouped into sets, and for each set (e.g., semantic segmentation set, instance segmentation set), a concave hull of the object can be created using the pixel coordinates (e.g., two-dimensional pixel coordinates).

The method 600 can include combining 630 (or aligning) the camera data with the lidar data. This can result in a combined and/or overlaid image comprising lidar data and camera data. As a non-limiting example, the method 600 can combine 635 the camera data with the lidar data by mapping each lidar point directly to a corresponding pixel in the one or more images from the camera data. Accordingly, the lidar data can be mapped to the masks (and thus the identified objects) of the camera data. The boresight can align the images of the camera data with the lidar data in two-dimensional space or in three-dimensional space. For example, one or more algorithms and/or software programs can be used to generate a boresight between the three-dimensional lidar points (e.g., point cloud) and 360-degree images from the camera data (whether it be received camera data or converted camera data). The boresight can align the camera data and the lidar data by correcting the position data (e.g., universal transverse mercator (UTM) position, global positioning system (GPS) position) and/or elevation data at which each image or instance of camera data and lidar data was captured. Once aligned, each lidar point of the lidar data can be mapped to a corresponding pixel of the camera data (e.g., in one or more images of the camera data). The creation of the boresight can be performed when creating, obtaining, or generating the images of the camera data (e.g., while converting 620 the camera data from the first image type to the second image type).

The method 600 can include creating 635 a point cloud based at least in part on the lidar data. Optionally, creating 640 the point cloud can be based at least in part on the location data. As an example, creating 640 the point cloud can include cropping lidar data at one or more locations where a component, sub-component, or the like has been recognized or identified. For example, the lidar points within a predetermined distance or predetermined radius from the location corresponding to the object recognized from the camera data can be cropped and exported for processing according one or more algorithms, such as the Hidden Point Removal technique. The Hidden Point Removal technique (or another process or technique) can filter out the lidar points that would not be seen if the lidar points formed a closed surface. That is to say, the Hidden Point Removal technique (or another process or technique) can remove the lidar points that should be hidden from the viewpoint or perspective from which the lidar data (and/or camera data) was obtained. The resulting lidar data can referred to as the point cloud. As will be appreciated, by performing the process(es) described herein, the point cloud can be transformed or adjusted to match the image format of the camera data to which the point cloud corresponds (e.g., 360-degree images, perspective images).

The method 600 can include classifying 640 the lidar data. The location of a given classified object from the camera data can be overlaid and/or translated to the lidar data corresponding to the same location, thereby classifying the lidar data. For example, the concave hull generated while performing 625 the one or more image and/or object recognition processes can be used to segment points within the point cloud into corresponding classification categories. Stated otherwise, the object classifications associated with the concave hulls from the camera data can be translated to the lidar data by way of the shared or overlapping locations of the concave hulls and corresponding lidar data.

Further, when the Hidden Point Removal technique (or a related process or technique) is performed, the point cloud can include only the lidar points within line of sight from the camera such that lidar points behind or overlapping the objects identified in the image recognition steps have been removed, which can increase the accuracy of the lidar classification.

Once the objects represented by the point cloud have been classified, the corresponding lidar data (e.g., lidar points) can be converted back to the three-dimensional format and can be merged with the original lidar data (i.e., the lidar data obtained by the lidar system, such as lidar system 102). Thus, the classified lidar data can be recombined with the unclassified lidar data, such that all captured lidar data can be viewed; in such a case, the classified lidar data can be grouped together as one or more layers, colors, or other indicators (e.g., a particular layer, color, or other indicator can be associated with a particular component or type of component). Alternatively, a mapping of the point cloud back to the original lidar data can be saved when the point cloud is generated, and the classification categories from the point cloud can be transferred via this mapping to the corresponding lidar points of the original lidar data (i.e., the lidar data obtained by the lidar system, such as lidar system 102), rather than converting the point cloud back to the three-dimensional format.

The method 600 can include creating 645 a mask for one or more of the objects identified from the camera data. The masks can identify one or more objects of interest that are represented by the camera data. As non-limiting examples, the masks can indicate wires, utility poles, devices and/or components installed on the pole, and the like. The masks can indicate a line corridor indicative of a plurality of connected poles and the devices and/or components installed thereon. The masks can be color-coded, shaded, hashed, and the like such that each type of device, component, and/or sub-component is differentiated from other types.

The method 600 can include determining 650 dimensions and/or locations of any objects identified in the combined lidar/camera data. As will be appreciated, the accuracy of these locations and/or dimensions can be more accurate than estimates based on camera data alone, which can rely on various assumptions and/or geometric calculations.

Figure 7:
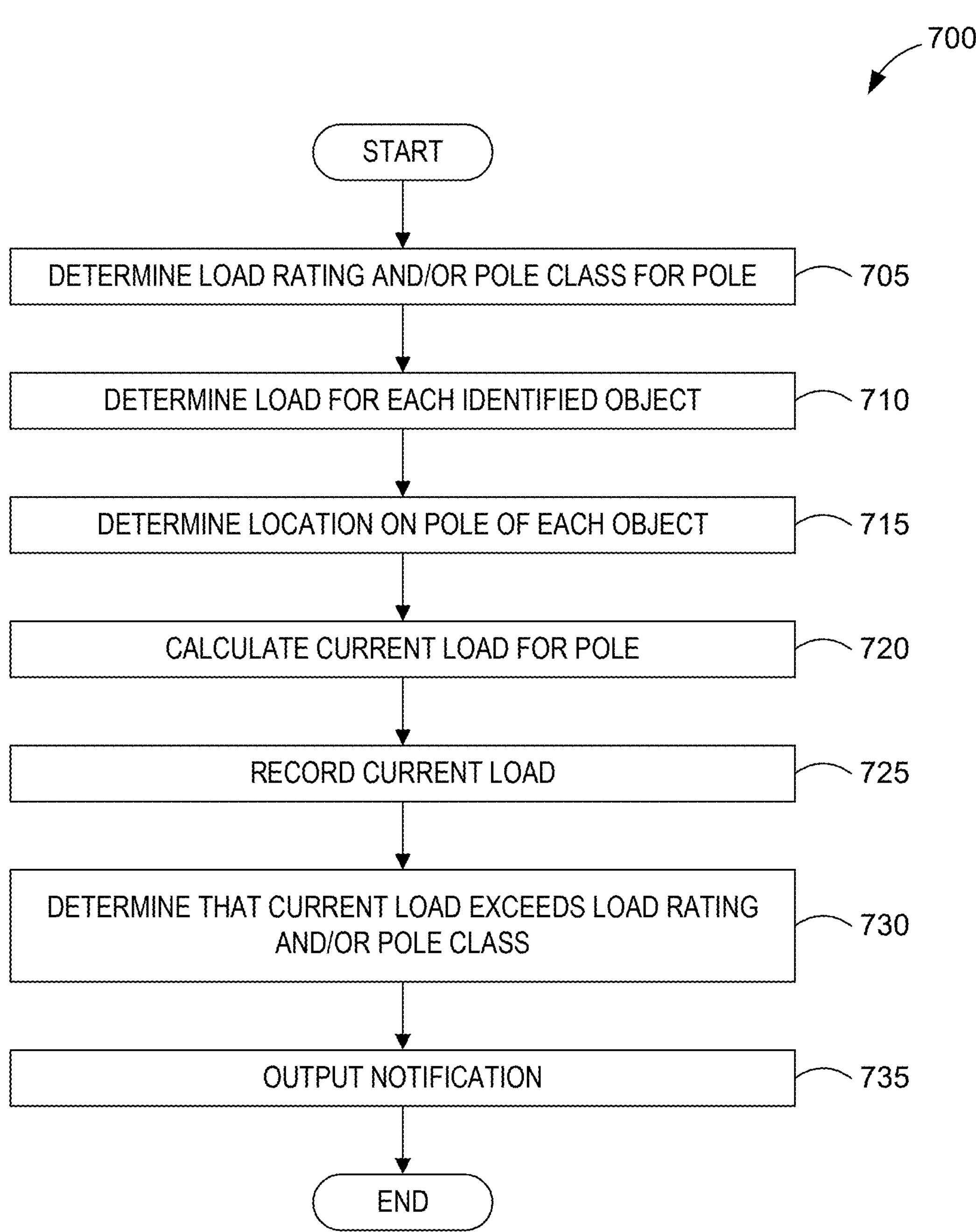
FIG. 7 illustrates a flowchart of an example method for performing a pole loading analysis for a utility pole, in accordance with the disclosed technology.

FIG. 7 shows a flowchart of a method 700 for performing a pole loading analysis for a utility pole. The method 700 can be performed in whole or in part by the computing device 210, a controller, or any other computing device. Moreover, the method 700 can be performed in conjunction with some or all of any other method described herein (e.g., method 600, method 800, method 900).

The method 700 includes determining 705 a load rating and/or pole class for a utility pole identified from camera data or combined camera/lidar data. This can include determining a location of the utility pole (e.g., based at least in part on corresponding location data) and/or identity of the utility pole and comparing the location or identity to stored pole data (e.g., a database of information relating to a population of poles). The stored pole data can include the pole class and/or loading information for a plurality of utility poles. Alternatively or in addition, determining 705 the pole class can include confirming updating the pole class and/or loading information stored in the pole database for a given pole. For example, based at least in part on the combined lidar/camera data, the diameter and height of the pole can be determined and/or the type of wood of the pole can be determined. Based on this information, the method 700 can include calculating and/or estimating a maximum compressive load, a maximum bending strength, or the like for the given pole and comparing the calculated/estimated maximum load, maximum bending strength, or the like to the stored pole data corresponding to the given pole. If the calculated/estimated maximum load matches or approximately matches the corresponding stored pole data, the stored pole data can be confirmed. Alternative, if the calculated/estimated maximum load differs from the stored data by a predetermined amount or a predetermined percentage, the method 700 can include updating the corresponding pole data and/or flagging the corresponding pole data for manual review.

The method 700 can include determining 710 (e.g., based at least in part on lidar/camera data) a load for each identified device, component, sub-component, or other object located on and/or attached to the pole (e.g., as discussed with respect to method 600). This can include comparing each identified device, component, sub-component, or other object to a pole loading database including the weight, mass, load, or the like for each device, component, sub-component, or other object. Optionally, the method 700 can include determining 715 (e.g., based at least in part on lidar/camera data) a location for each identified device, component, sub-component, or other object located on and/or attached to the pole (e.g., as discussed with respect to method 600). Based at least in part on the load data and/or the location data for each object, the method 710 can include calculating 720 the load (e.g., a total compressive load, a total moment, a total bending moment, a total bending load) for the pole.

The method 700 can include recording 725 the current load(s) of the pole, as well as the date and time, if desired (e.g., in the pole loading database or another memory location). The method 700 can include determining 730 whether the pole is undergoing a load that exceeds the rated load for that pole (or is within a predetermined amount or percentage of the rated load). In response to determining 730 that the pole exceeds the rated load (or is within a predetermined amount of percentage of the rated load), the method 700 can include outputting 735 a notification (e.g., for a technician, a utility pole service provider, and/or a utility service provider). The notification can include information identifying the pole and indicating that the current load exceeds the rated load (or is within a predetermined amount of percentage of the rated load), the current load, and/or the rated load. Alternatively or in addition, the notification can include instructions (e.g., for a technician, a utility pole service provider, and/or a utility service provider) for reinforcing the pole to increase the rate load and/or pole class of the pole. Alternatively or in addition, the notification can include instructions (e.g., for a technician, a utility pole service provider, and/or a utility service provider) for removing one or more devices and/or components from the pole. Alternatively or in addition, the notification can include instructions (e.g., for a technician, a utility pole service provider, and/or a utility service provider) for installing an additional pole and moving the removed devices and/or components to the additional pole.

Figure 8:
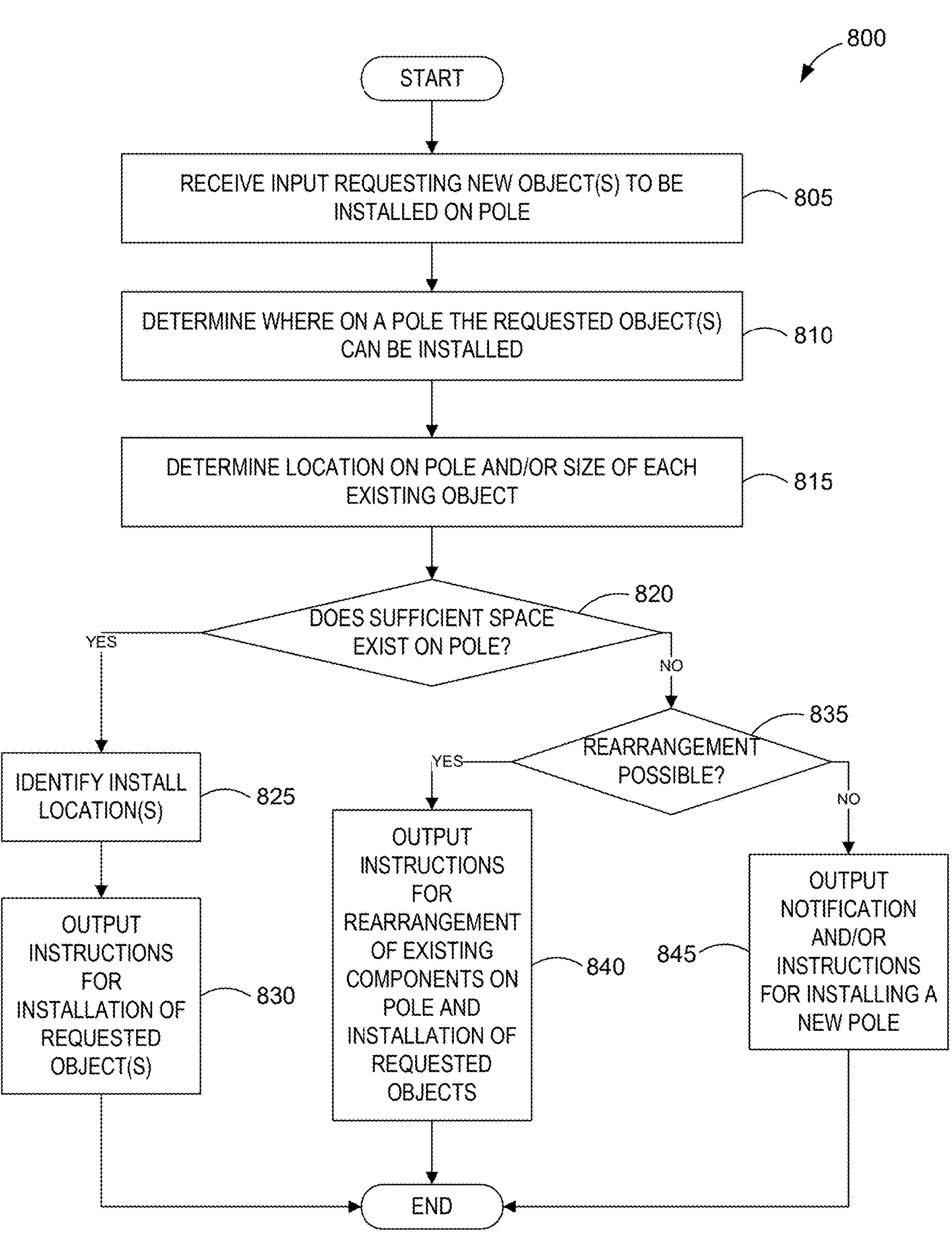
FIG. 8 illustrates a flowchart of an example method for performing a clearance analysis for a utility pole, in accordance with the disclosed technology.

FIG. 8 shows a flowchart of a method 800 for performing a clearance analysis (e.g., make-ready engineering) for a utility pole. As will be appreciated, the method 800 can help determine whether sufficient space exists on a pole and/or span for new wires, devices, components, and/or other objects. Alternatively or in addition, the method 800 can help determine how to rearrange existing components or objects on a pole to create sufficient space on the pole for new wires, devices, components, and/or other objects. The method 800 can be performed in whole or in part by the computing device 210, a controller, or any other computing device. Moreover, the method 800 can be performed in conjunction with some or all of any other method described herein (e.g., method 600, method 700, method 900).

The method 800 can include receiving 805 an input indicating a desired service, device, component, and/or combination of devices or components that is desired to be installed on a utility pole. As will be appreciated, governing standard and regulations can dictate where on a pole (e.g., at which height) a given service, device, and/or component can be located. The input can indicate the dimensions and/or location(s) on the pole corresponding to the desired service, device(s), and/or component(s). Alternatively or in combination, the method 800 can include determining 810 where on a pole (e.g., at which height) the requested service, device, and/or component can be located (e.g., as discussed with respect to method 600).

The method 800 can include determining 815 (e.g., based at least in part on lidar/camera data) the location (i.e., on the pole) and/or size of each identified device, component, sub-component, or other object located on and/or attached to the pole (e.g., as discussed with respect to method 600). The method 800 can also include determining a size and/or a required install location (e.g., height on pole, circumferential location on pole) for the requested service, device, and/or component. This can include receiving an input indicating the size and/or required installed location. Alternatively or in addition, this can include comparing the requested service, device, and/or component to stored component data (e.g., a component database), and based on the comparison, identifying a size of the necessary device(s) and/or component(s) required for installation of the requested service, device, and/or component. Alternatively or in addition, this can include identifying, based on the comparison, a required install location for the necessary device(s) and/or component(s) required for installation of the requested service, device, and/or component. Thus, the method 800 can include determining 820 whether sufficient space exists on the pole for the requested service, device, and/or component.

If sufficient space does exist, the method 800 can include identifying 825 the location(s) at which to install the requested service, device, and/or component on the pole. The method 800 can include outputting 830 instructions (e.g., for a technician, a utility pole service provider, and/or a utility service provider) to install one or more devices and/or components at a respective determined location.

If sufficient space does not exist, the method 800 can include determining 835 whether existing devices and/or components can be rearranged on the pole to create sufficient space for the requested service, device, and/or component. If the existing devices and/or components can be rearranged to create sufficient space, the method 800 can include outputting 840 notification (e.g., for a technician, a utility pole service provider, and/or a utility service provider) to rearrange components on the pole according to a determined component arrangement. The notification can include an arrangement diagram and/or heights or other locations at which to move one or more devices and/or components.

If the existing devices and/or components cannot be rearranged to create sufficient space, the method 800 can include outputting 845 a notification (e.g., for a technician, a utility pole service provider, and/or a utility service provider) indicating that sufficient space for the requested service, device, and/or component cannot be created on the pole and/or instructing that a new pole should be installed to accommodate the requested service, device, and/or component.

Figure 9:
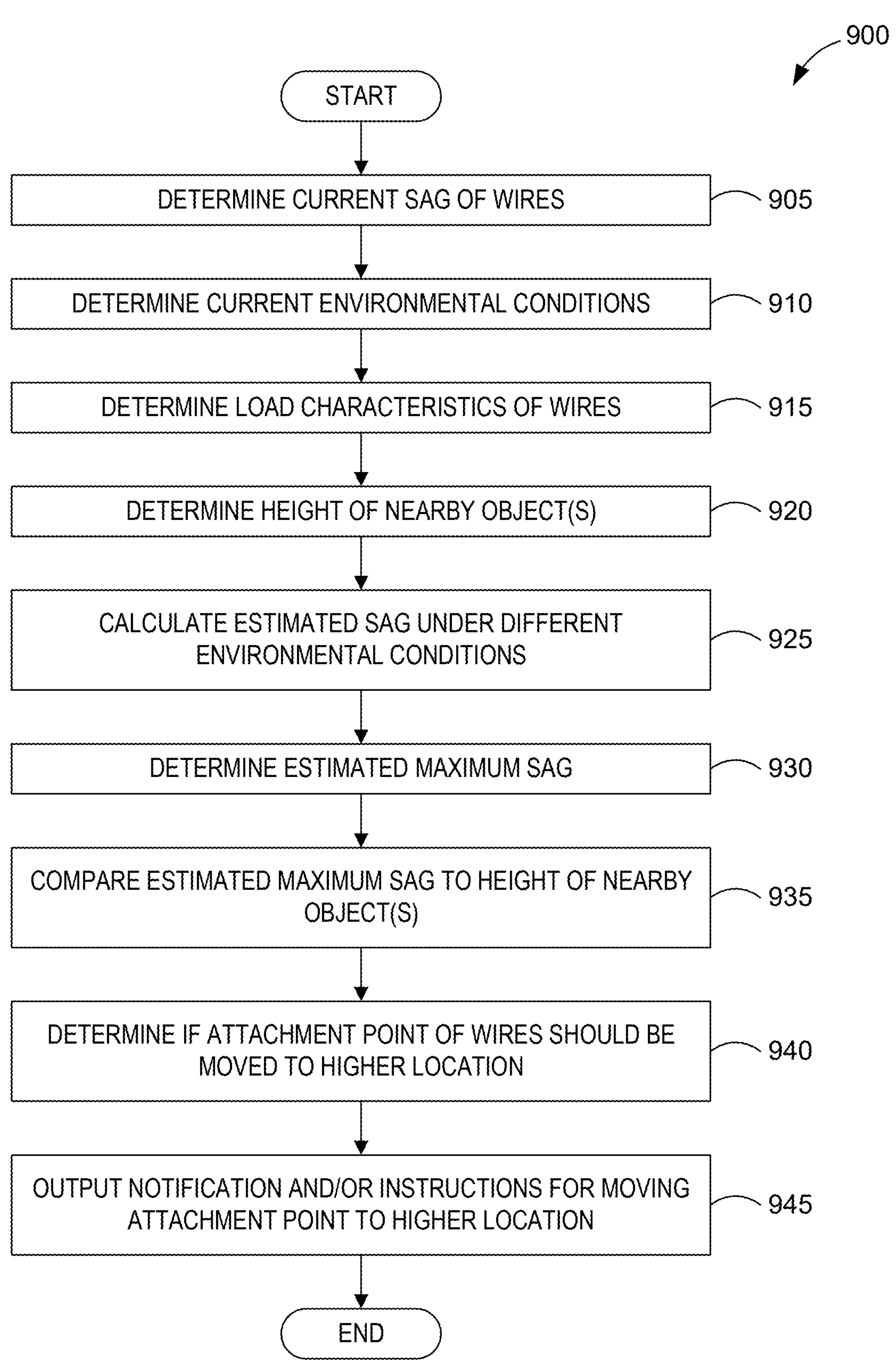
FIG. 9 illustrates a flowchart of an example method for performing a wire sag analysis for wires connected to a utility pole, in accordance with the disclosed technology.

FIG. 9 shows a flowchart of a method 900 for performing a wire sag analysis for wires attached or connected to a utility pole. The method 900 can be performed in whole or in part by the computing device 210, a controller, or any other computing device. Moreover, the method 900 can be performed in conjunction with some or all of any other method described herein (e.g., method 600, method 700, method 800).

The method 900 can include determining 905 (e.g., based at least in part on lidar/camera data) a current sag of wires and/or the current minimum height (e.g., from ground level) of wires attached or connected to a pole (e.g., wires extending between adjacent poles) (e.g., as discussed with respect to method 600). That is, the method 900 can include determining the current height of the wires at the bottom of the wires' sag arc. The method 900 can include determining 910 current environmental conditions at the location of the wires (e.g., from a temperature sensor, from a humidity sensor). Alternatively or in addition, the method 900 can include receiving (e.g., from a weather service) data indicative of current environmental conditions at the location of the wires. The method 900 can include determining 915 (e.g., based at least in part on lidar/camera data) one or more load characteristics of the wires (e.g., as discussed with respect to method 600), such as the weight per unit length of the wires and/or the material(s) of the wire's conductor(s), the material(s) of the wire's insulator(s), and/or the material(s) the sheath. For example, the method 900 can include identifying the type of wire(s) and comparing the type of wire(s) to stored wire data (e.g., a wire database storing characteristics of different types of wires). Based on the stored wire data, the weight per unit length for the identified wire type(s) and/or other information.

The method 900 can include determining 920 (e.g., based at least in part on lidar/camera data) the height of any objects (e.g., vegetation, buildings, structures, road signs) under and/or near the wires (e.g., as discussed with respect to method 600).

The method 900 can include calculating 925 the estimated sag of the wires under different environmental conditions (e.g., predetermined extreme weather conditions, forecasted weather conditions, historical extreme weather conditions at the location of the wires). Based on the calculations, the method 900 can include determining 930 an estimated maximum sag and/or estimated minimum height of the wires.

The method 900 can include comparing 935 the estimated maximum sag and/or estimated minimum height of the wires to the heights of any objects under and/or near the wires and/or to governing standards and regulations. Based on this comparison, the method 900 can include determining 940 if the wires should be moved to an attachment point that is higher on the utility pole (or other structure). For example, the method 900 can include determining that the wires should moved to a higher attachment location if the estimated maximum sag and/or estimated minimum height of the wires would interfere become within a predetermined distance from any objects under and/or near the wires or if the estimated maximum sag and/or estimated minimum height of the wires would be non-compliant with governing standards and regulations.

The method 900 can include outputting 945 a notification (e.g., to a device for a technician, a utility pole service provider, and/or a utility service provider) indicating that the estimated maximum sag may exceed a maximum sag threshold, the estimated minimum height of the wires may fall below a minimum height threshold, and/or the wires may interfere with a nearby object (e.g., vegetation, buildings, structures, road signs). Alternatively or in addition, the notification can include instructions for moving the attachment point of the wires to a higher location on the utility pole (or another structure supporting the wires).

EXAMPLE USE CASE

The disclosed technology can include obtaining camera data with a camera, lidar data with a lidar system, and location data with a geolocation system. The geolocation data can be obtained simultaneously or substantially simultaneously with at least one of the camera data and the lidar data such that the corresponding location is associated with the obtained camera data and/or lidar data. The camera data, lidar data, and location data can be obtained simultaneously or substantially simultaneously. Alternatively, data can be obtained simultaneously or substantially simultaneously with the camera data and second location data can be obtained simultaneously or substantially simultaneously with the lidar.

Regardless, the camera data, lidar data, and location data can be transmitted to, and received by, a computing device. The computing device can optionally convert the camera data from a first image type to a second image type. This conversion can be omitted, depending on the image type associated with the initial camera data. For example, it can unnecessary or undesirable to convert the camera data to a new image type if the camera data is representative of perspective imagery, but it may be necessary or desirable to convert the camera data to a new image type (e.g., perspective imagery) if the camera data is representative of 360-degree imagery.

The computing device can perform one or more image and/or object recognition processes on the camera data, whether the camera data be the original camera data received from the camera or converted camera data that has been converted from a first image type to a second image type. For example, if the original camera data is representative of perspective imagery, the image and/or object recognition processes can be performed on the original camera data. As another example, if the original camera data is representative of 360-degree imagery, the image and/or object recognition processes can be performed on the converted camera data (which can be representative of perspective imagery).

The computing device can combine or align the camera data with the lidar data. For example, the combination or alignment of the camera data and lidar data can match the respective locations of images from the camera data and lidar points from the lidar data.

The computing device can create a point cloud. For example, the point cloud can be created by trimming lidar points within a certain distance from the edges of objects recognized or identified in the camera data. The computing device can execute one or more processes or algorithms on the point cloud to remove any lidar points that would not be visible in a corresponding image from the same line of sight (e.g., Hidden Point Removal technique).

The computing device can classify the lidar data. For example, the computing device can transfer the image classifications corresponding to the earlier image and/or object recognition process(es) to the corresponding lidar points in the point cloud. As such, the computing device can perform objection recognition or identification on lidar data.

The computing device can optionally create masks for the camera data and/or lidar data to visually identify one or more objects in the camera data and/or lidar data. The computing device can also determine dimensions and/or locations of any objects identified in the combined camera data and/or lidar data. Based on the object recognition in the camera data and/or lidar data, the computing device can perform further actions, such as performing a pole loading analysis for a utility pole, performing a clearance analysis (e.g., make-ready engineering) for a utility pole, performing a wire sag analysis for wires attached or connected to a utility pole, or any other useful action or analysis.

While certain examples of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

Certain implementations of the disclosed technology are described above with reference to block and flow diagrams of systems and methods and/or computer program products. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Although certain aspects of the disclosed technology are discussed herein in relation to a particular device or system or a particular method, it is contemplated that the disclosed technology is not so limited. To that end, any part of the devices or systems described herein can be embodied in, and/or performed as, a method and/or a non-transitory, computer-readable medium having instructions stored thereon that, when executed by a processor, cause a related device to perform the method; any part the methods described herein can be embodied in, and/or performed as, a device or system and/or a non-transitory, computer-readable medium having instructions stored thereon that, when executed by a processor, cause a related device to perform the method.

What is claimed is:

1. A system comprising:
- a lidar system configured to obtain lidar data;
- a camera system configured to obtain camera data;
- a geolocation sensor configured to obtain location data; and
- a computing device configured to:
  - receive lidar data from the lidar system;
  - receive camera data from the camera system;
  - receive location data from the geolocation sensor;
  - associate the lidar data and the camera data with the location data to define a capture location;
  - execute one or more object recognition processes with the camera data to identify recognized objects from the camera data and create classified camera data corresponding to the recognized objects, the recognized objects including a utility pole and one or more components attached to the utility pole;
  - align the camera data with the lidar data;
  - determine, based at least in part on the location data, a location of the utility pole to confirm or update a class of the utility pole in a database;
  - classify the lidar data to create classified lidar data, the classifying including identifying a portion of the lidar data that corresponds to the recognized objects from the camera data;
  - determine a component load for each of the one or more components;
  - determine a total load for the utility pole, the total load comprising the component load for each of the one or more components;
  - receive a request for a new component to be installed;
  - determine, based at least in part on a size of the new component, whether sufficient space is available on the utility pole for installation of the new component; and
  - in response to determining that sufficient space is not available, determine whether any of the one or more components attached to the utility pole can be rearranged to create sufficient space for the new component.

2. The system of claim 1, wherein the computing device is further configured to:
- determine that the total load for the utility pole exceeds a load rating for the utility pole; and
- output a notification for a remote computing device, the notification identifying the utility pole and indicating that the total load for the utility pole exceeds the load rating for the utility pole.

3. The system of claim 2, wherein the notification includes instructions for structurally reinforcing the utility pole, thereby increasing the load rating for the utility pole.

4. The system of claim 2, wherein the notification includes instructions for removing at least one of the one or more components from the utility pole.

5. The system of claim 4, wherein the notification further includes instructions for installing a new utility pole and installing the at least one of the one or more components on the new utility pole.

6. The system of claim 1, wherein the computing device is further configured to:
- determine one or more dimensions of at least one of the one or more components based at least in part on the classified camera data and the classified lidar data.

7. The system of claim 1, wherein the computing device is further configured to:
- determine, based at least in part on the classified camera data and the classified lidar data, a pole location for each of the one or more components, each pole location can include a location along a length of the utility pole.

8. The system of claim 7, wherein each pole location comprises a location along a circumference of the utility pole.

9. A system comprising:
- a lidar system configured to obtain lidar data;
- a camera system configured to obtain camera data;
- a geolocation sensor configured to obtain location data; and
- a computing device configured to:
  - receive lidar data from a lidar system;
  - receive camera data from a camera system;
  - receive location data from the geolocation sensor;
  - associate the lidar data and the camera data with the location data to define a capture location;
  - execute one or more object recognition processes with the camera data to identify recognized objects from the camera data and create classified camera data corresponding to the recognized objects, the recognized objects including a utility pole and one or more components attached to the utility pole;
  - align the camera data with the lidar data;
  - determine, based at least in part on the location data, a location of the utility pole to confirm or update a class of the utility pole in a database;
  - classify the lidar data to create classified lidar data, the classifying including identifying a portion of the lidar data that corresponds to the recognized objects from the camera data;
  - determine, based at least in part on the classified camera data and the classified lidar data, a pole location for each of the one or more components, each pole location can include a location along a length of the utility pole;
  - receive a request for a new component to be installed;
  - determine, based at least in part on a size of the new component and the pole location for each of the one or more components, whether sufficient space is available on the utility pole for installation of the new component; and
  - in response to determining that sufficient space is not available, determine whether any of the one or more components attached to the utility pole can be rearranged to create sufficient space for the new component.

10. The system of claim 9, wherein the computing device is further configured to:

determine, based on a component type of the new component, a required pole location for the new component, wherein determining whether sufficient space is available on the utility pole for installation of the new component is further based on the required pole location for the new component.

11. The system of claim 9, wherein the computing device is further configured to:

in response to determining that sufficient space is available, identify an installation location for the new component, the installation location being a location on the utility pole; and output a notification for a remote computing device, the notification including instructions for installing the new component on the utility pole at the installation location.

12. The system of claim 9, wherein the computing device is further configured to:

in response to determining that the one or more components attached to the utility pole can be rearranged to create sufficient space for the new component, output a notification for a remote computing device, the notification including instructions for rearranging at least one of the one or more components and installing the new component on the utility pole.

13. The system of claim 9, wherein the computing device is further configured to:

in response to determining that the one or more components attached to the utility pole cannot be rearranged to create sufficient space for the new component, output a notification for a remote computing device, the notification indicating that sufficient space for the new component is not available.

14. A system comprising:

a lidar system configured to obtain lidar data;

a camera system configured to obtain camera data;

a geolocation sensor configured to obtain location data; and a computing device configured to:

receive lidar data from a lidar system;

receive camera data from a camera system;

receive location data from the geolocation sensor;

associate the lidar data and the camera data with the location data to define a capture location;

execute one or more object recognition processes with the camera data to identify recognized objects from the camera data and create classified camera data corresponding to the recognized objects, the recognized objects including a utility pole and one or more components attached to the utility pole;

determine, based at least in part on the location data, a location of the utility pole to confirm or update a class of the utility pole in a database;

align the camera data with the lidar data;

classify the lidar data to create classified lidar data, the classifying including identifying a portion of the lidar data that corresponds to the recognized objects from the camera data;

determine, based at least in part on the classified camera data and the classified lidar data, a current sag of a wire;

receive a request for a new component to be installed;

determine, based at least in part on a size of the new component, whether sufficient space is available on the utility pole for installation of the new component; and in response to determining that sufficient space is not available, determine whether any of the one or more components attached to the utility pole can be rearranged to create sufficient space for the new component.

15. The system of claim 14, wherein the computing device is further configured to:

determine current environmental conditions at a location of the wire; and calculate an estimated maximum sag based at least in part on the current sag, the current environmental conditions, and different environmental conditions.

16. The system of claim 15, wherein the computing device is further configured to:

calculate an estimated minimum wire height based at least in part on the estimated maximum sag;

determine, based at least in part on the estimated minimum wire height, that the wire should be moved to a new attachment point on the utility pole that has a greater height than a current attachment point of the wire; and output a notification for a remote computing device, the notification including instructions for moving the wire from the current attachment point to the new attachment point.

17. The system of claim 16, wherein determining that the wire should be moved to the new attachment point on the utility pole comprises:

determining, based at least in part on the classified camera data and the classified lidar data, a height of an object near the wire; and determining that a difference between the estimated minimum wire height and the height of the object is less than a predetermined threshold.

18. They system of claim 1, wherein the computing device is further configured to generate a map indicative of the location of the utility pole based at least in part on the camera data, the lidar data, and the location data.

19. The system of claim 1, wherein the computing device automatically performs a pole loading analysis based on the pole class and/or the identified recognized objects.

* * * * *